United States Patent [19]
Billdal et al.

[11] Patent Number: 6,135,716
[45] Date of Patent: Oct. 24, 2000

[54] RUNNER FOR FRANCIS-TYPE HYDRAULIC TURBINE

[75] Inventors: Jan Tore Billdal, Strømen; Olav Rommetveit, Oslo; Hermod Brekke, Trondheim, all of Norway

[73] Assignee: GE Energy (Norway) AS, Lysaker, Norway

[21] Appl. No.: 09/194,540
[22] PCT Filed: Jul. 28, 1997
[86] PCT No.: PCT/NO97/00194
§ 371 Date: Jan. 8, 1999
§ 102(e) Date: Jan. 8, 1999
[87] PCT Pub. No.: WO98/05863
PCT Pub. Date: Feb. 12, 1998

[30] Foreign Application Priority Data
Aug. 2, 1996 [NO] Norway ..................................... 963261

[51] Int. Cl.[7] .................................. F03B 3/02; F03B 3/12
[52] U.S. Cl. ..................... 416/183; 416/186 R; 416/187; 416/223 A; 416/223 B; 416/238; 416/242
[58] Field of Search ............................... 416/186 R, 188, 416/233 A, 233 B, 242, 238, 187, 183

[56] References Cited

U.S. PATENT DOCUMENTS

| | | | |
|---|---|---|---|
| 147,351 | 2/1874 | Tyler | 416/186 R |
| 149,646 | 4/1874 | Egery | 416/186 R |
| 340,120 | 4/1886 | Hussey | 416/186 R |
| 1,670,558 | 5/1928 | White | 416/186 R |
| 3,639,080 | 2/1972 | Yamabe | |
| 4,479,757 | 10/1984 | Holmes et al. | |

FOREIGN PATENT DOCUMENTS

| | | | |
|---|---|---|---|
| 367947 | 1/1928 | Germany | |
| 63-75362 | 4/1988 | Japan | 415/116 |

OTHER PUBLICATIONS

McNabb et al.; The Effects of Blade Lean on Hydraulic and Mechanical Characteristics of Francis Runners; (Symposium 1986—Montreal); pp. 1–13.

*Primary Examiner*—Christopher Verdier
*Attorney, Agent, or Firm*—Rothwell, Figg, Ernst & Manbeck

[57] ABSTRACT

Disclosed is a runner for a Francis-type hydraulic turbine, comprising a ring, a hub, and a number of blades all having a curved shape and being attached to the ring and hub. Each blade has an inlet edge and an outlet edge. The blades are characterized in that, in the direction of turbine rotation, the junction point of each blade inlet edge at the ring is located forwardly of the inlet edge attachment point for that blade at the hub, and the junction point of each blade outlet edge at the hub is located forwardly of the outlet edge attachment point for that blade at the ring.

4 Claims, 5 Drawing Sheets

RUNNER FOR FRANCIS-TYPE HYDRAULIC TURBINE

BACKGROUND OF THE INVENTION

Through a long development from old time the common types of hydraulic turbines have reached a stage of development where most practical designs follow rather established conventions and rules, whereby only small improvements have been obtained during the recent years. In this field however great gains are possible even with relatively small improvements, for example of the efficiency.

The present invention is directed to runners for Francis-type turbines, where in particular the blade shape can have a quite complicated geometry with many parameters, in the first place in association with the runner hub and the surrounding band or ring to which the blades are attached. In addition to efficiency there are in particular cavitation problems that challenge people skilled in the art in attempts to improve the properties of Francis-type runners. As a consequence of the complicated geometrical relationships, water flow patterns and many parameters involved, it is difficult to predict how changes in blade geometry will affect the desired properties. Besides it is expensive and time consuming to carry out experiments with varying geometry and parameters, even if scaled-down models are used.

Thus, more specifically the invention relates to a runner for a Francis-type hydraulic turbine, comprising a ring or band, a hub and a number of blades having a curved shape and attached to the ring and the hub, where each blade has an inlet edge adapted to face towards an upstream guide apparatus in the turbine and an outlet edge adapted to face towards a downstream outlet opening.

Runners in conventional Francis-type turbines have a typical shape and orientation of the blades, characterized by a positive blade leaning at their inlet edge and an outlet edge extending in radial direction. Traditional Francis runners have the weakness that at the suction side of the blade along the ring there is generated a low pressure zone that can lead to cavitation and unfavourable flow conditions introducing losses (reduction of the hydraulic efficiency of the turbine). The cause of this is, inter alia, cross flow at the pressure side, namely that the water does not follow the theoretically favourable flow paths, but takes a more axial direction at the pressure side of the blade. This cross flow is mainly due to a larger pressure difference between surface portions adjacent to the hub and the ring respectively, at the pressure side of the blade. It has been attempted to solve the cavitation problem for example by placing the attachment of the inlet edge at the ring locally more forward in the rotational direction of the runner. Such a solution has been described in particular in Norwegian patent No. 163,378 (corresponding to U.S. Pat. No. 4,479,757). The design according to the patent reduces the problems of cavitation at the blade inlet towards the ring, but will to a small degree reduce the unfavourable cross flow along the pressure side of the blades.

Whereas the patent specification referred to above has been directed to the inlet edge of the blades, the present applicants in earlier runner designs for Francis turbines have employed a specific design with respect to the outlet edge of the blades, namely with such an outlet edge having an inclination deviating from the radial direction, i.e. with an angle of inclination forwardly in the rotational direction of the runner as seen from the hub towards the ring. This has a stabilizing effect on the water flow through the turbine.

SUMMARY OF THE INVENTION

Surprisingly it has now been found according to the present invention that remarkably good improvements with respect to efficiency and cavitation conditions are obtained by essentially combining the particular designs mentioned above, as regards the relative location and configuration of the inlet edge and the outlet edge, respectively. The novel and specific features in the runner according to the invention, are stated more closely in the claims.

The solution presented here involves a strongly twisted shape of the curved blades, deviating in a rather characteristic way from the conventional and known blade shapes in Francis turbines. Runners based upon the invention can be used in Francis turbines wherein the structure can otherwise be traditional, and accordingly the runner can be installed in replacement of existing or old runners in such turbines, i.e. while retaining for example the same spiral casing, stays, guide apparatus and the same draft tube design. Turbines with these new runners in practice can be particularly favourable with a head of as much as a couple of hundred meters.

BRIEF DESCRIPTION OF THE DRAWINGS

In the following description the invention will be explained more closely with reference to the drawings, wherein.

DETAILED DESCRIPTION OF THE INVENTION

Figure 1:
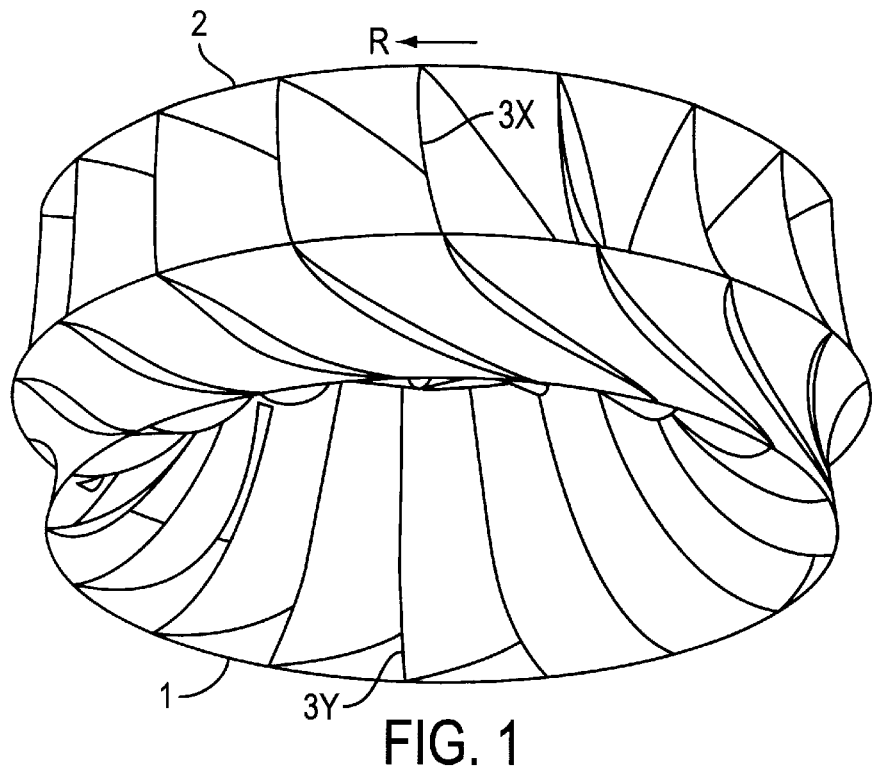
FIG. 1 in perspective view shows a Francis-type runner with a blade configuration of traditional type, FIG. 2 in a corresponding manner but at a somewhat different perspective and simplified, shows an example of an embodiment of a runner according to the present invention, FIG. 3 somewhat simplified and in elevation shows a runner corresponding to the one in FIG. 2.

In the known design illustrated in FIG. 1, there is schematically shown a hub or crown 2 and a ring 1 to which the blades are attached in a usual manner. What in particular is to be noted in the blade configuration of FIG. 1, is the somewhat rearward lean or extension of the inlet edge 3x of the blades as seen from the hub towards the ring, related to the rotational direction which is indicated with the arrow R. The blade outlet edge 3y is arranged along a generally radial line, as it is quite conventional.

Figure 2:
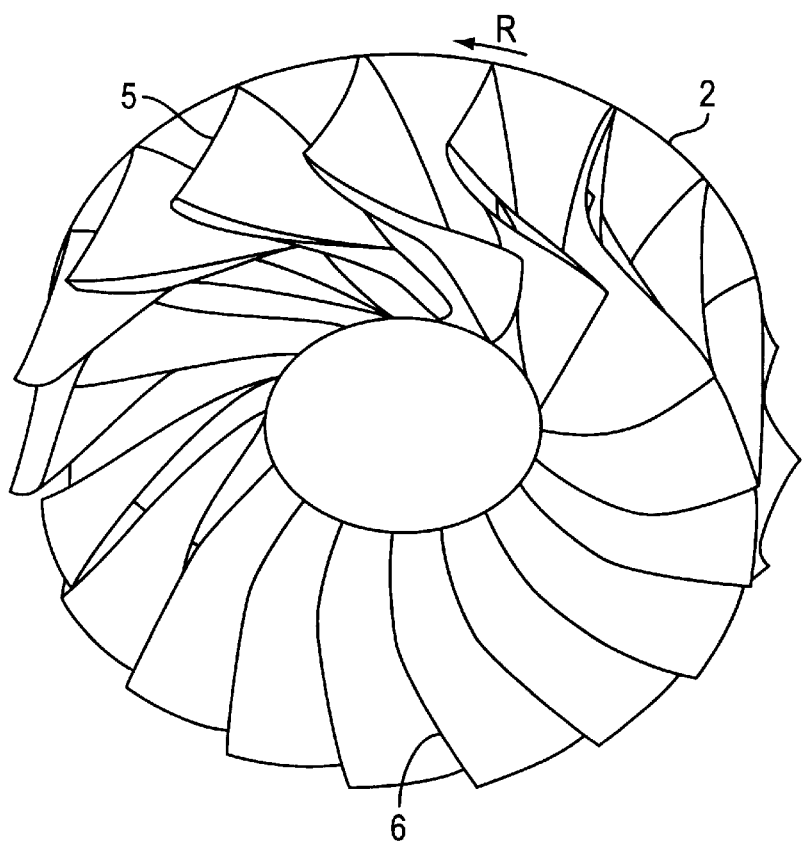

The runner according to the invention as illustrated in FIG. 2, is also shown with a hub 2, but for clarity the actual surrounding ring or band has been omitted in this figure. However, the end portions of the blades being attached to the ring, are in part visible from this figure of drawings. Here the inlet edge 5 of the blades in the principle have an opposite leaning compared to the design of FIG. 1, when the indicated rotational direction R in FIG. 2 is taken into account. Moreover it is seen that the blade outlet edge 6 extends at an inclination forwardly as seen from the hub towards the ring in FIG. 2, in contrast to the radial outlet edge 3y referred to in connection with FIG. 1. What is further to be noted in the configuration of the blades in FIG. 2, is a more or less twisted shape. The combination of the leaning of the inlet edge and the inclination of the outlet edge influences the degree of such twisting. These geometrical relationships will further be apparent from the following discussion of FIGS. 3–6 of the drawings.

Figure 3:
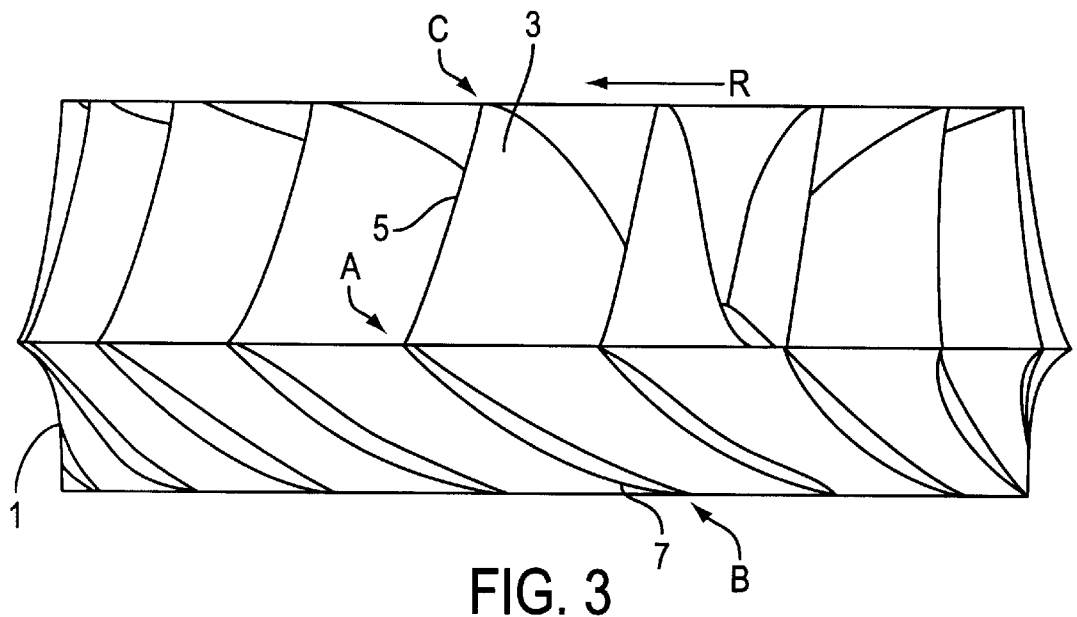
Figure 4:
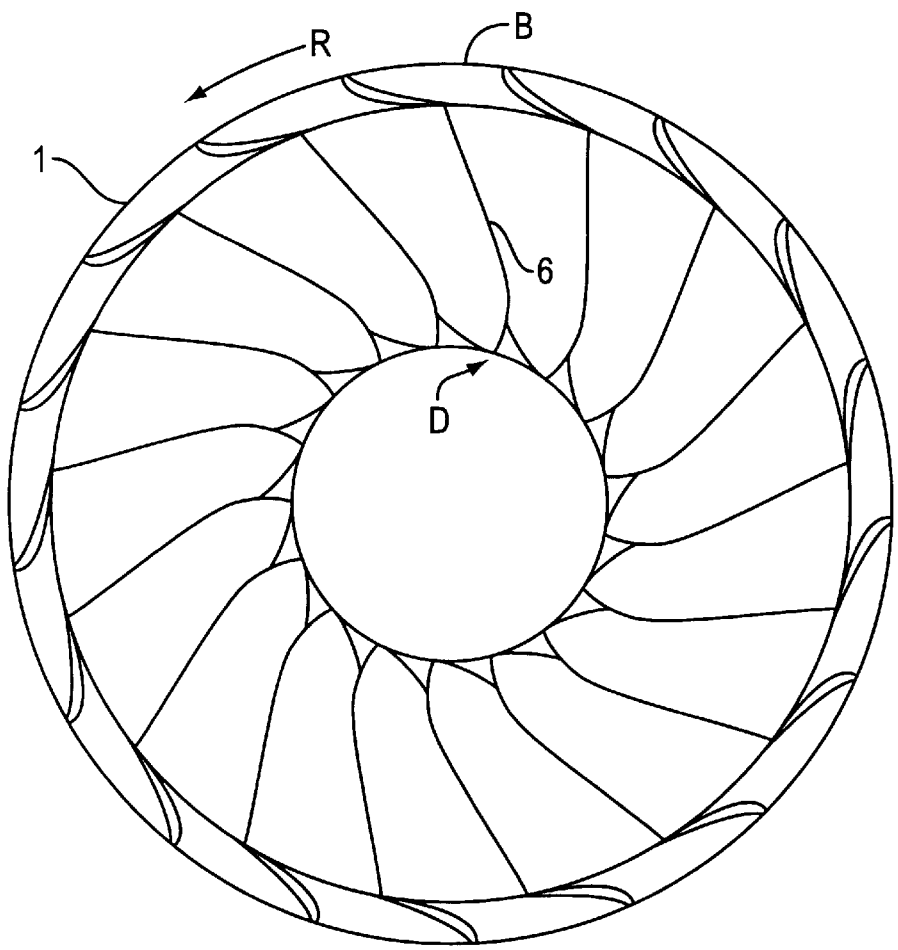
FIG. 4 shows the runner in FIG. 3 as seen from below.

FIGS. 3 and 4 illustrate additional features that have been mentioned already with reference to FIG. 2, namely the configuration of the blade inlet edge 5 and correspondingly with respect to outlet edge 6. In FIG. 3 the ring 1 actually has been represented only by its internal contour. At 7 there is shown how the joining zone or surface 7 between the end of blade 3 and ring 1 looks. In FIG. 3 and partly in FIG. 4 arrows have been inserted for indicating points or positions in the runner configuration, that can be considered to characterize in a practical manner the particular blade shape being here described. There points are:

A—The junction or attachment points of the blade inlet edge 5, at the ring 1,

B—the attachment points of the blade outlet edge 6, at the ring 1,

C—the attachment point of the inlet edge at the hub 2, and

D—the attachment point of the outlet edge at the hub 2 (point D is not shown in FIG. 3).

Figure 5:
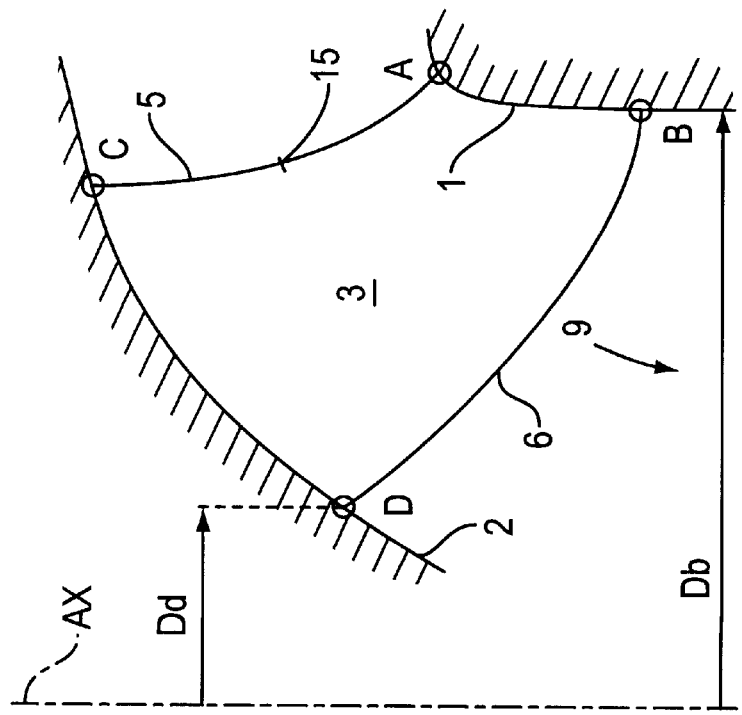
FIG. 5 shows a schematic axial section (meridian section) of a single blade as an example of an embodiment according to the invention.

The schematic axial section of FIG. 5 gives a more complete and clear illustration of how the above mentioned points A, B, C, and D are defined in the arrangement of ring 1, hub 2 and blade 3. Each of the four points in FIG. 5 (and in FIG. 6) are indicated with a small circle. FIG. 5 also schematically shows the axis of rotation Ax of the runner, wherein also two dimensions are indicated, i.e. the diameter Dd with respect to point D and the diameter Db with respect to point B. The diameter ratio Dd/Db represents a parameter of significance in connection with the new blade configuration in the runner according to the invention. In association with the remaining features to be discussed more closely below, it has been found advantageous that the diameter ratio Dd/Db is within a range between 0.3 and 0.4, since this results in a desired stable flow downstream of the runner, in particular in the lower range of the diameter ratio.

An additional feature according to the invention is also illustrated in 5, namely by the positional or dimensional relationship involving that the attachment point D of the outlet edge 6 at the hub 2, is located at a level being lower than the middle portion or central point 15 of the blade inlet edge 5. When there is here a question of "lower", this refers to a vertical axis Ax, as it is common at least in the case of larger Francis turbines.

Figure 6:
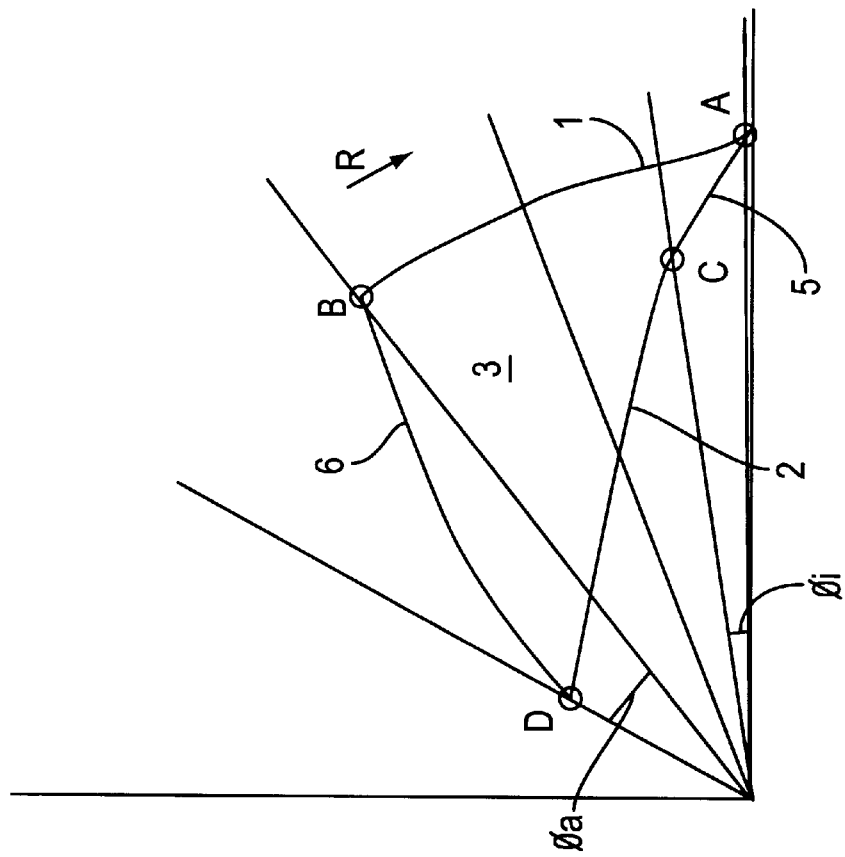
FIG. 6 shows a corresponding blade as seen in axial direction (r$\phi$ plot) of the suction side of a blade for a runner according to the invention, FIGS. 7A, 7B, 7C for comparison show water flow patterns represented by the velocity vector, at the pressure side of three different blade configurations, and FIGS. 8A, 8B, 8C in a corresponding way for three different configurations show the pressure distribution at the suction side of the three types of blades.

The most important features in the runner according to the invention are best illustrated in FIGS. 3, 4 and 6, showing how the four points A, B, C and D mentioned, are located angularly in relation to the axis of rotation. This axis is represented by origin in the diagram of FIG. 6. Thus FIG. 6 shows the blade 3 as seen in an axial direction of FIG. 5. The rotational direction is again indicated in FIG. 6 with the arrow R. From origin (axis Ax) in FIG. 6 there is moreover drawn some radial lines illustrating angular relationships of much significance, also as seen in relation to the rotational direction R.

These essential relationships according to the invention are best seen from FIG. 6, but also from FIGS. 3 and 4 as follows:

Point A is located forwardly of point C as seen in the rotational direction R, and point B leads point D as seen in the rotational direction R. This is the configuration that influences the particular and controlled twisted shape of the blade 3, and according to the invention has been found to give remarkable results with respect to the water flow pattern, pressure distribution and thereby efficiency as well as cavitation properties.

As regards the magnitude of the dimensional or angular relationships discussed above, it has further been found to be advantageous that the illustrated angular extension $\phi a$ of outlet edge 6 taking the rotational direction in account, is larger than the corresponding angular extension $\phi i$ of inlet edge 5. This dimensional relationship between the two angles also appear from FIG. 6. In this connection it is desirable that angle $\phi a$ is quite significantly larger than angle $\phi i$, and that angle $\phi a$ has an absolute magnitude at least equal to 15°. In some embodiments the angle $\phi i$ can be rather small, but in practice this does not mean that $\phi a$ is correspondingly reduced to a minimal magnitude.

With reference to the figures of drawings discussed above, there is additionally here as an example mentioned that advantageous embodiments in practice are obtained when the meridian section of the suction side of the blade forms an angle of about 30° to the normal at the outlet edge 6, both to the hub and to the ring.

Figure 7A:
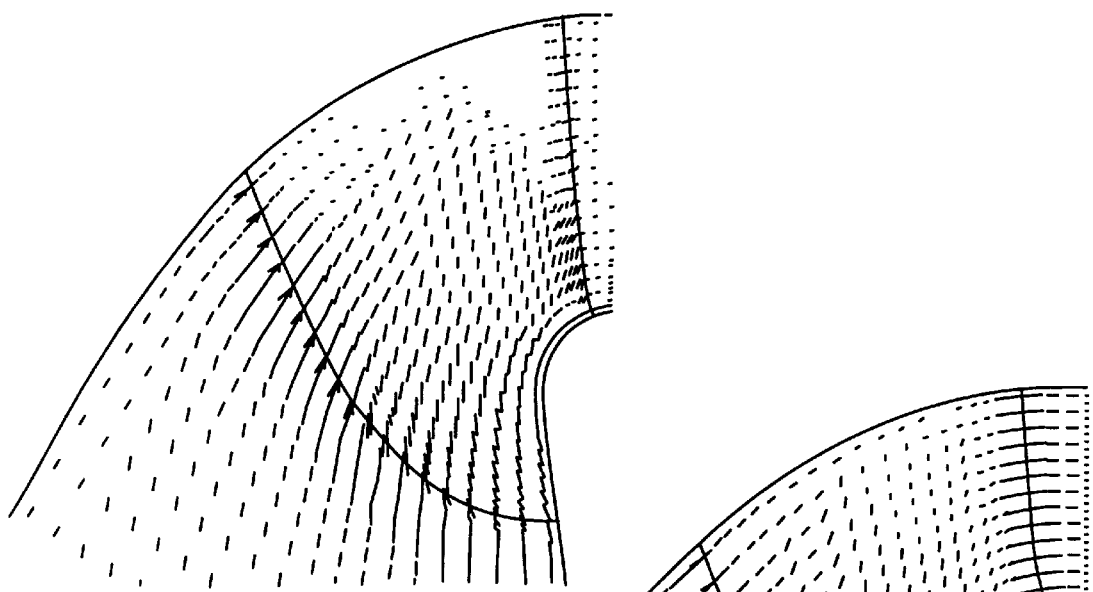
Figure 7B:
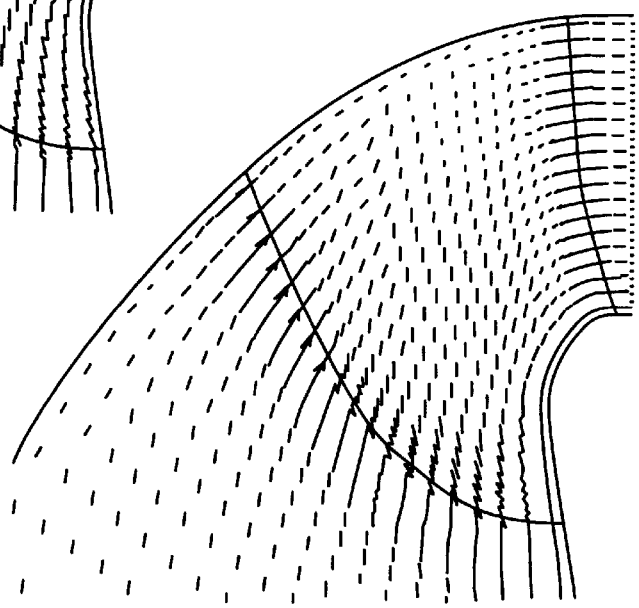
Figure 7C:
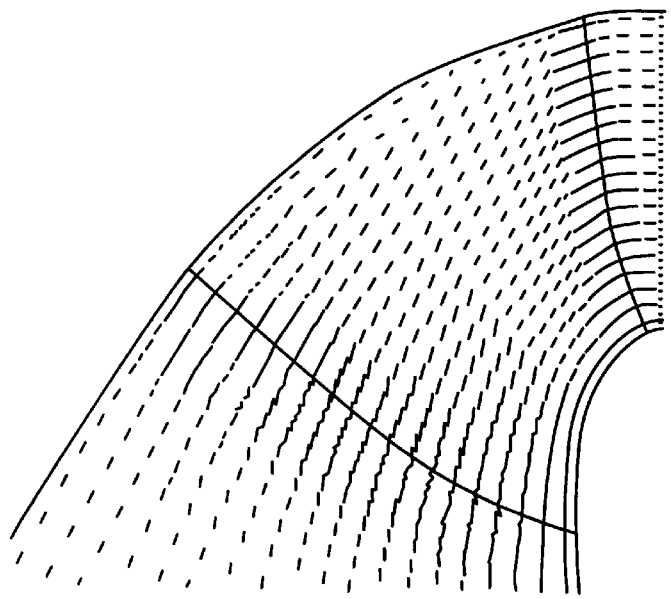
Figure 8A:
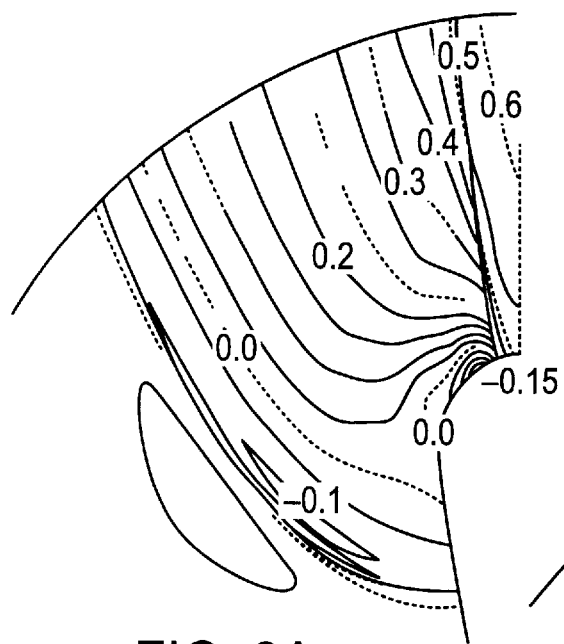
Figure 8B:
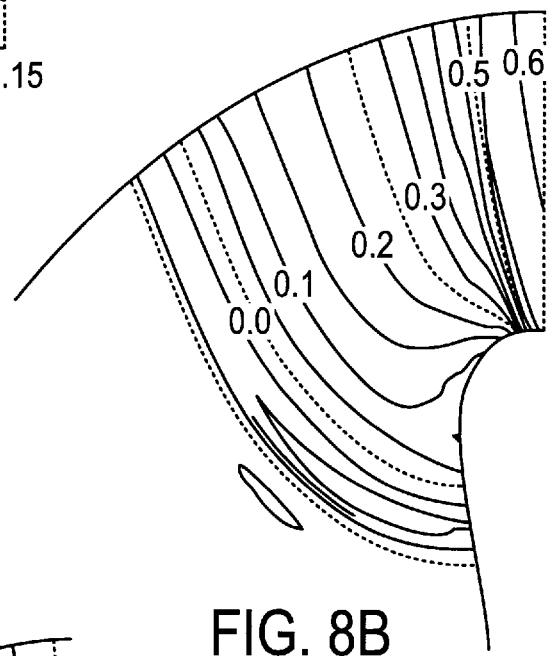
Figure 8C:
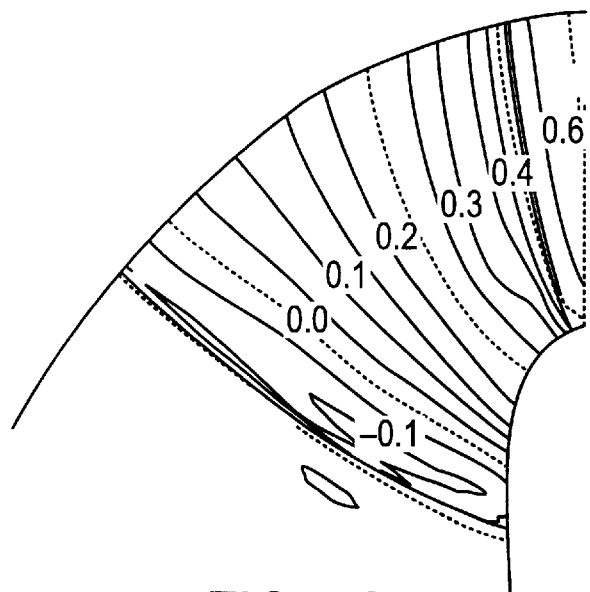

FIGS. 7 and 8 serve to illustrate the results obtained by the invention, compared to the prior particular designs referred to above. Thus FIGS. 7A and 8A respectively, show the flow pattern at the pressure side and the pressure relationships at the suction side of a blade of the particular design from the present applicant, as referred to in the introductory portion of this description. FIGS. 7B and 8B correspondingly show the relationships at a blade arranged in the principle as described in the Norwegian patent specification referred to above. For comparison FIGS. 7C and 8C in a corresponding way illustrate how the properties are improved to a high degree by employing runners with blades having a shape according to the present invention.

The flow relationships, i.e. the velocity vectors at the pressure side of the blade, are shown in a conventional meridian section. The pressure relationships are also illustrated in meridian section along the suction side of the blade, whereby there are drawn curves being isobars, and besides several numerical values have been inserted.

The runner with the known blade shape being taken as a basis for FIGS. 7A and 8A, is characterized by a low pressure along the suction side of the blade, in particular adjacent to the place where the inlet edge joins the ring, and furthermore the flow pattern shows that at the pressure side of the blade a detrimental cross flow is found.

The other known design, being taken as a basis for FIGS. 7B and 8B, as previously explained is modified by having the joint or attachment of the inlet edge at the ring, locally moved forwardly in the rotational direction of the runner. This results in an increase of pressure at the inlet edge, compared to the relationships of FIG. 8A, but in contrast there has not been any improvement with respect to the cross flow at the pressure side of the blade, as will be seen from FIG. 7B.

When observing now FIGS. 7C and 8C, relating to an embodiment according to the invention, it appears that the pressure along the suction side of the blade can be balanced so that there is obtained an approximate, smoothly decreasing pressure from the inlet edge to the outlet edge over the whole blade (FIG. 8C). As a consequence of a better pressure balance or equalization of the blade, the velocity vectors at the pressure side of this runner will follow the theoretical and desired water flow paths in a better way (FIG. 7C). It is apparent from this that the invention involves highly desired improvements in the properties both with respect to cavitation and with respect to flow conditions.

What is claimed is:

1. A runner for a Francis-type hydraulic turbine, comprising a ring (1), a hub (2) and a number of blades (3) having a curved shape and being attached to the ring and the hub, where each blade (3) has an inlet edge (5) adapted to face towards an upstream guide apparatus in the turbine and an outlet edge (6) adapted to face towards a downstream draft tube (9) from the turbine, characterized in that the junction or attachment point (A) of the blade inlet edge (5) at the ring (1) is located forwardly of the inlet edge junction or attachment point (C) at the hub, and that the attachment point (B) of the blade outlet edge (6) at the ring (1), is located forwardly of the outlet edge attachment point (D) at the hub (2), as seen in the rotational direction (R) of the runner.

2. The runner according to claim 1, wherein an angular extension ($\phi$a) of the outlet edge (6) relative to an axis of rotation of the hub is larger than an angular extension ($\phi$i) of the inlet edge (5) relative to said axis of rotation of the hub, and wherein said angular extension ($\phi$a) of the outlet edge is at least equal to 15°.

3. The runner according to claim 1, wherein the ratio between the diameters (Dd and Db) at the attachment points of the outlet edge of the hub (2) and the ring (1) respectively, is between 0.3 and 0.4.

4. The runner according to claim 1, wherein the attachment point (D) of the outlet edge at the hub (2) is located lower than the middle point (15) of the blade inlet edge (5).

* * * * *